No. 761,643. PATENTED JUNE 7, 1904.
A. BACKMAN.
HOSE COUPLING.
APPLICATION FILED SEPT. 12, 1903.
NO MODEL.
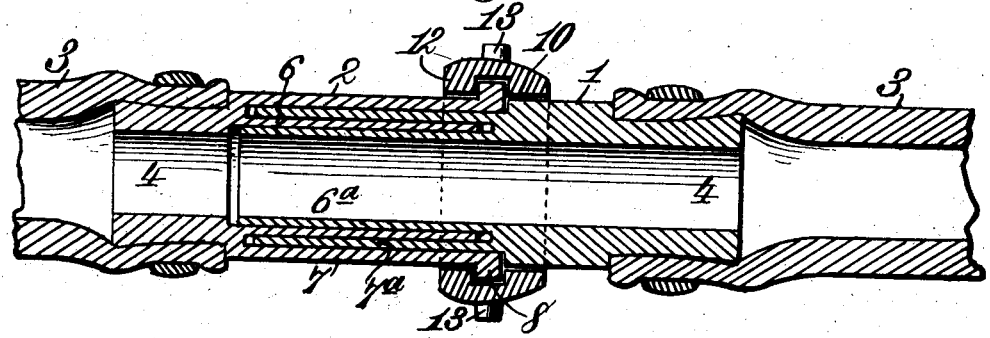
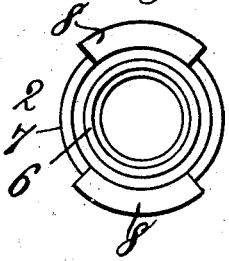 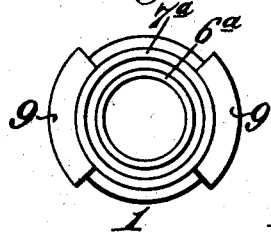 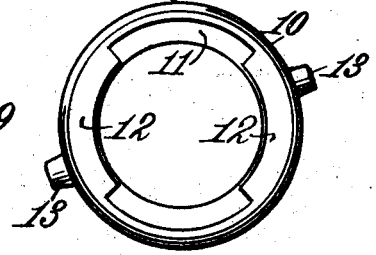
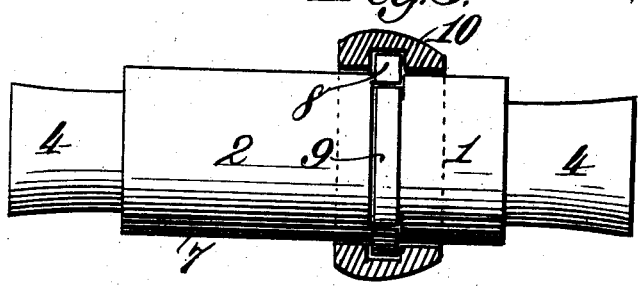
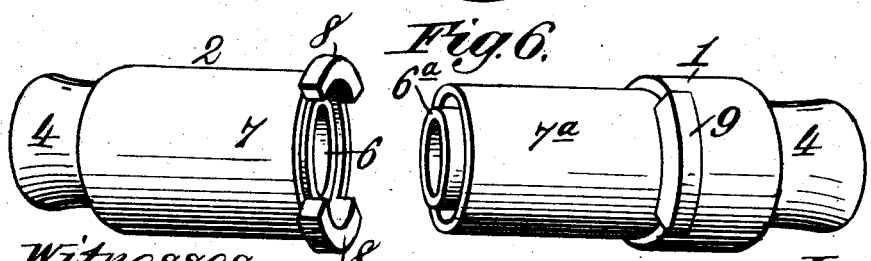
Witnesses
Robert Everett
James L. Norris Jr.
Inventor
August Backman.
By James L. Norris
Atty.

No. 761,643.    Patented June 7, 1904.

UNITED STATES PATENT OFFICE.

AUGUST BACKMAN, OF VIRGINIA, MINNESOTA.

HOSE-COUPLING.

SPECIFICATION forming part of Letters Patent No. 761,643, dated June 7, 1904.

Application filed September 12, 1903. Serial No. 172,959. (No model.)

*To all whom it may concern:*

Be it known that I, AUGUST BACKMAN, a citizen of the United States, residing at Virginia, in the county of St. Louis and State of Minnesota, have invented new and useful Improvements in Hose-Couplings, of which the following is a specification.

This invention relates to hose-couplings, and has for its object to provide a coupling which will be simple and inexpensive in construction and in which the two pipe-sections united by said coupling will be incapable of turning independently of one another, whereby it will be rendered impossible for the coupling to be accidentally separated, and which has for its further object to provide a coupling wherein provision is made for effectively preventing leakage; and to these ends my invention consists in the features and in the construction, combination, and arrangement of parts hereinafter described, reference being had to the accompanying drawings, forming a part of this specification, wherein—

Figure 1 is a longitudinal sectional view of my improved coupling. Figs. 2 and 3 are respectively end views of the two separable sections of the coupling. Fig. 4 is a similar view of the locking-ring. Fig. 5 is a view in elevation, showing the locking-ring in section; and Fig. 6 is a perspective view showing the parts of the coupling separated one from the other.

Referring to the drawings, the numerals 1 and 2, respectively, indicate the two members of the coupling to which the hose 3 is attached. In practice each one of said members is provided with a reduced portion 4, over which the ends of the hose-sections 5 are slipped and may be attached to said reduced portions by wiring or in any other well-known manner. The two members 1 and 2 are respectively formed of an inner and outer concentric cylindrical portion 6 and 7 and $6^a$ and $7^a$, the inner cylindrical portion 7 of the member 1 sliding within the cylindrical portion $7^a$ of the member 2 and the outer cylindrical portion 6 of the member 1 sliding between the portion $6^a$ and $7^a$ of the member 2. These parts in practice are constructed to somewhat accurately fit one another, but not so tightly as to prevent the two members from being readily coupled and uncoupled. These two members constitute, in effect, a slip-joint which will effectively prevent any leakage. Formed on the end of the member 2 are two segmental flanges 8, which project circumferentially beyond the adjacent portion of the member upon which said flanges are formed, and formed on the periphery of the member 1 are similar segmental flanges 9, each of said flanges 8 and 9 being approximately ninety degrees (90°) in extent, whereby when the two members are fitted one upon the other the flanges 8 and 9 will constitute practically an unbroken and uninterrupted radially-projecting annular ring, and inasmuch as the one pair of said flanges—as 8, for example—lies between the other pair of flanges 9 it will be impossible for one of the members to be turned independently of the other member for the purpose hereinafter explained.

Arranged on one of the members of the coupling—as 1, for example—is a locking-ring 10, comprising a ring provided on its rear end with an inwardly-projecting flange 11 and provided at its forward end with two inwardly-projecting segmental flanges 12, each of which is substantially ninety degrees (90°) in extent. By turning the ring 12 on the member 1 the segmental flanges 8 of said member interlock between the flange 11 and segmental flanges 12 of said ring. The member 2 can then be slipped upon the member 1, the ring being first turned in such position that the flanges 9 of the member 2 will pass between the flanges 8 of the member 1. Then by giving the ring a partial turn its flanges 12 will overlap the flanges 8 and 9 of the two members of the coupling and will rigidly hold said members together. As before described, the flanges 8 and 9 interlocking together, as shown, will prevent one section of the coupling from turning upon the other, and the locking-ring 10 engaging the opposite sides of the flanges 8 and 9 will prevent any liability of the two members of the coupling becoming separated. In practice the locking-ring 10 may be provided with lugs or projections 13, which are adapted to be engaged by a spanner to turn the locking-ring when it is desired to couple or uncouple the two members of the coupling.

Having described my invention, what I claim is—

In a pipe-coupling the combination with two coupling members each comprising two concentric cylindrical portions arranged to fit one within the other, the outer cylindrical portion of each of said members being provided with two segmental-shaped outwardly-projecting flanges, and a rotatable locking-ring mounted on one of said members and provided at one end with a continuous inwardly-projecting flange and at its other end with two segmental-shaped inwardly-projecting flanges, the flanges on said locking-ring being arranged to engage and overlap the flanges on the two coupling members, substantially as described.

In testimony whereof I have hereunto set my hand in presence of two subscribing witnesses.

AUGUST BACKMAN.

Witnesses:
JOHN CURRY,
CHAS. GRONBERG.